US010388035B2

(12) United States Patent
Takahashi

(10) Patent No.: US 10,388,035 B2
(45) Date of Patent: Aug. 20, 2019

(54) IMAGE PROCESSING APPARATUS, IMAGE PROCESSING METHOD, AND STORAGE MEDIUM

(71) Applicant: CANON KABUSHIKI KAISHA, Tokyo (JP)

(72) Inventor: Ryo Takahashi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 19 days.

(21) Appl. No.: 15/655,090

(22) Filed: Jul. 20, 2017

(65) Prior Publication Data

US 2018/0040143 A1 Feb. 8, 2018

(30) Foreign Application Priority Data

Aug. 4, 2016 (JP) .................................. 2016-154022

(51) Int. Cl.
  *G06K 9/00* (2006.01)
  *G06T 11/00* (2006.01)
  *G06T 7/00* (2017.01)
  *G06T 5/00* (2006.01)

(52) U.S. Cl.
  CPC .............. *G06T 11/001* (2013.01); *G06T 5/00* (2013.01); *G06T 7/97* (2017.01); *G06T 2207/10024* (2013.01); *G06T 2207/30168* (2013.01); *G06T 2207/30242* (2013.01)

(58) Field of Classification Search
  CPC ......... G06T 11/001; G06T 2207/10024; G06T 2207/30168; G06T 2207/30242; G06T 5/00; G06T 7/97

See application file for complete search history.

(56) References Cited

U.S. PATENT DOCUMENTS

| 7,424,171 B2 | 9/2008 | Matsuzaka |
| 8,094,966 B2 | 1/2012 | Matsuzaka |
| 8,417,067 B2 * | 4/2013 | Nakao ................ H04N 1/00204 348/231.2 |
| 8,483,509 B2 | 7/2013 | Matsuzaka |
| 2005/0174449 A1 | 8/2005 | Matsuzaka |

(Continued)

FOREIGN PATENT DOCUMENTS

| JP | 2005-251166 A | 9/2005 |
| JP | 2014-115311 A | 6/2014 |

*Primary Examiner* — Bhavesh M Mehta
*Assistant Examiner* — Ian L Lemieux
(74) *Attorney, Agent, or Firm* — Venable LLP

(57) ABSTRACT

There is provided an image processing apparatus. An obtainment unit obtains a first parameter pertaining to a number of pixels and a second parameter pertaining to image quality aside from the number of pixels. A changing unit instructs the first parameter and the second parameter to be changed. An image processing unit generates a first image by carrying out image processing on an original image in accordance with the changed first parameter and the changed second parameter, and generates a second image in accordance with the changed first parameter and the second parameter before the change. A display control unit displays the first and second images. A recording control unit carries out control such that an image generated by carrying out the image processing on the original image in accordance with the changed first parameter and the changed second parameter is recorded.

18 Claims, 14 Drawing Sheets

(56) References Cited

U.S. PATENT DOCUMENTS

| | | | |
|---|---|---|---|
| 2005/0175260 A1* | 8/2005 | Takahashi | G06T 11/60 382/309 |
| 2008/0218605 A1 | 9/2008 | Matsuzaka | |
| 2009/0290042 A1* | 11/2009 | Shiohara | H04N 1/00132 348/222.1 |
| 2012/0086835 A1 | 4/2012 | Matsuzaka | |

* cited by examiner

F I G. 1
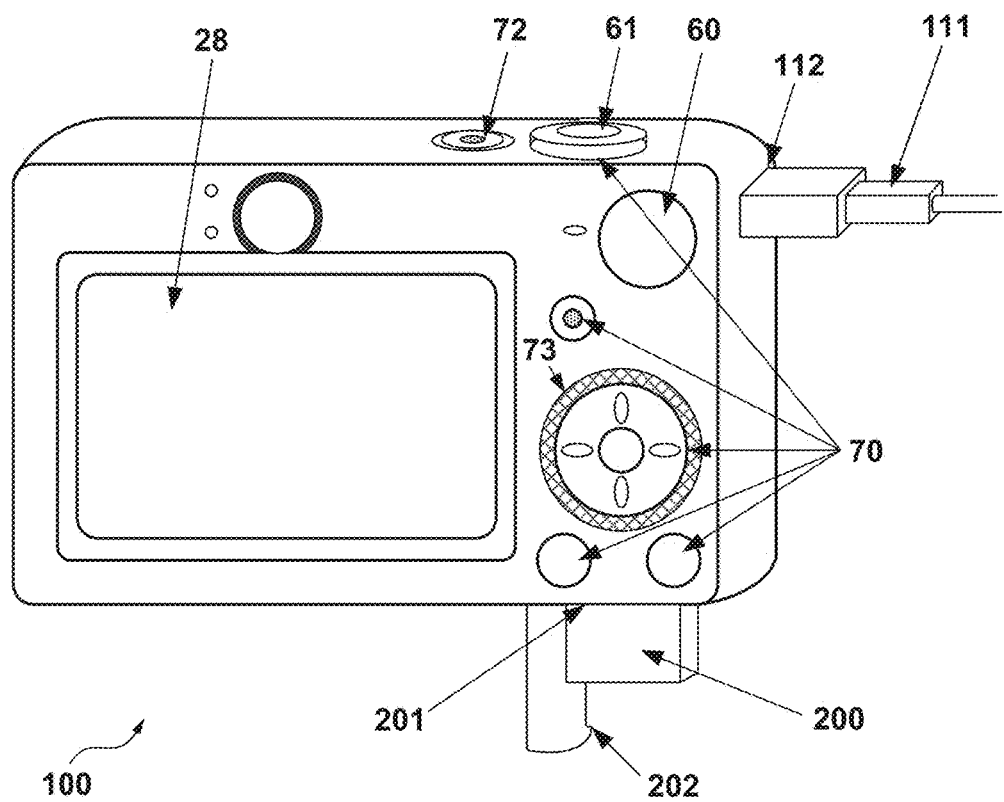

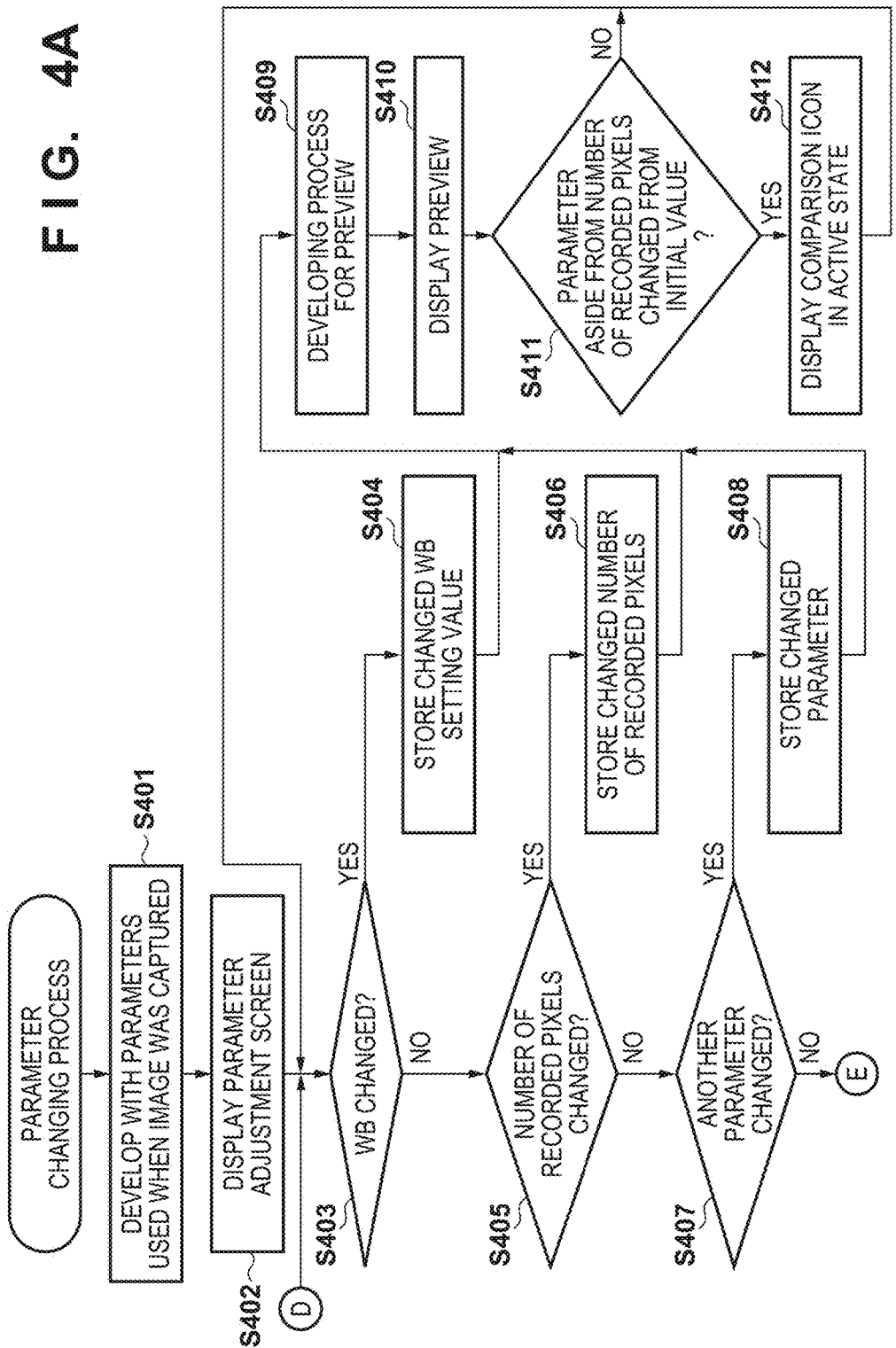

IMAGE PROCESSING APPARATUS, IMAGE PROCESSING METHOD, AND STORAGE MEDIUM

BACKGROUND OF THE INVENTION

Field of the Invention

The present invention relates to an image processing apparatus, an image processing method, and a storage medium.

Description of the Related Art

In recent image capturing apparatuses such as digital cameras, more and more models have functions for recording images output from the image sensor into a recording medium directly as RAW images, on which image processing has not been performed. A RAW image can be displayed as, for example, a full-color image by performing a process called "developing". The process of developing a RAW image is typically carried out non-destructively using an external image processing apparatus or an image processing function provided in the image capturing apparatus. Some image capturing apparatuses can record RAW images along with corresponding developed images such as JPEG images. In such a case, a JPEG image is generated by carrying out a developing process on the RAW image when the image is captured, and developing parameters used in the developing process are recorded in a RAW image file along with the RAW image. By carrying out the developing process having adjusted the image quality by specifying desired developing parameters as post-processing for the RAW image recorded in this manner, a user can obtain a developed image from the RAW image that better meets his/her preferences.

In the case where the user uses the image capturing apparatus to adjust the image quality of the RAW image, such as adjusting the brightness or adjusting the contrast, the user selects the developing parameters and adjusts the values thereof. For example, the user sets the brightness to ±0 and the contrast to +2. The image capturing apparatus then develops the RAW image on the basis of the adjusted developing parameters. In the case where the RAW image has a high number of pixels, and the image capturing apparatus develops the RAW image each time the user adjusts the image quality, each instance of processing takes a long time. In response to this, Japanese Patent Laid-Open No. 2005-251166 discloses a technique in which when the display magnification is less than the actual size, pixels are extracted from a RAW image at a ratio that is lower the lower the display magnification is. The developing process is then carried out on the extracted pixels and the resulting image is displayed as a preview. This makes it possible to reduce the amount of time needed to confirm the result of adjusting the image quality.

Adjusting the image quality of a RAW image can involve changing both parameters for color processing such as white balance, and parameters pertaining to the image size such as those used in a resizing process (a pixel number changing process). In such a case, even if the user compares the developed images corresponding to the pre- and post-change parameters, it is difficult to judge whether the change in the image quality between before and after the parameters were changed was produced by the change in the color processing parameters or the change in the image size parameters. This is because the process for reducing the number of pixels for the resizing sometimes involves processing that may change colors (for example, a process that determines the color of a specific pixel in the resized image on the basis of the colors of a plurality of pixels in the pre-resizing image).

The user may wish to confirm the effects of changing the color processing parameters on the image quality, for example. However, because changes to the image size parameters also affect the image quality, it is difficult to confirm the effect of adjusting the color processing parameters on the image quality.

SUMMARY OF THE INVENTION

Having been achieved in light of such circumstances, the present invention makes it easier, in the case where image processing is carried out while adjusting a plurality of image processing parameters, for a user to confirm the effect on the image quality caused by adjusting some of the image processing parameters.

According to a first aspect of the present invention, there is provided an image processing apparatus comprising: an obtainment unit configured to obtain, as parameters pertaining to image processing, a first parameter pertaining to a number of pixels and a second parameter pertaining to image quality aside from the number of pixels; a changing unit configured to instruct the first parameter and the second parameter to be changed; an image processing unit configured to generate a first image by carrying out the image processing on an original image in accordance with the first parameter changed in response to an instruction from the changing unit and the second parameter changed in response to an instruction from the changing unit, and generate a second image by carrying out the image processing on the original image in accordance with the first parameter changed in response to an instruction from the changing unit and the second parameter before being changed in response to an instruction from the changing unit; a display control unit configured to carry out control such that the first image and the second image are displayed; and a recording control unit configured to, in response to a user instruction to save an image to which a change is applied, carry out control such that an image generated by the image processing unit carrying out the image processing on the original image in accordance with the changed first parameter and the changed second parameter is recorded into a recording unit as an image file.

According to a second aspect of the present invention, there is provided an image processing method comprising: obtaining, as parameters pertaining to image processing, a first parameter pertaining to a number of pixels and a second parameter pertaining to image quality aside from the number of pixels; instructing the first parameter and the second parameter to be changed; generating a first image by carrying out the image processing on an original image in accordance with the first parameter changed in response to the instructing and the second parameter changed in response to the instructing, and generating a second image by carrying out the image processing on the original image in accordance with the first parameter changed in response to the instructing and the second parameter before being changed in response to the instructing; carrying out control such that the first image and the second image are displayed; and in response to a user instruction to save an image to which a change is applied, carrying out control such that an image generated by carrying out the image processing on the original image in accordance with the changed first parameter and the changed second parameter is recorded into a recording unit as an image file.

According to a third aspect of the present invention, there is provided a non-transitory computer-readable storage medium which stores a program for causing a computer to execute an image processing method comprising: obtaining, as parameters pertaining to image processing, a first parameter pertaining to a number of pixels and a second parameter pertaining to image quality aside from the number of pixels; instructing the first parameter and the second parameter to be changed; generating a first image by carrying out the image processing on an original image in accordance with the first parameter changed in response to the instructing and the second parameter changed in response to the instructing, and generating a second image by carrying out the image processing on the original image in accordance with the first parameter changed in response to the instructing and the second parameter before being changed in response to the instructing; carrying out control such that the first image and the second image are displayed; and in response to a user instruction to save an image to which a change is applied, carrying out control such that an image generated by carrying out the image processing on the original image in accordance with the changed first parameter and the changed second parameter is recorded into a recording unit as an image file.

Further features of the present invention will become apparent from the following description of exemplary embodiments (with reference to the attached drawings).

BRIEF DESCRIPTION OF THE DRAWINGS

FIG. 1 is an external view of a digital camera 100.

FIGS. 4A and 4B are flowcharts illustrating a parameter changing process (step S308).

DESCRIPTION OF THE EMBODIMENTS

Figure 2:
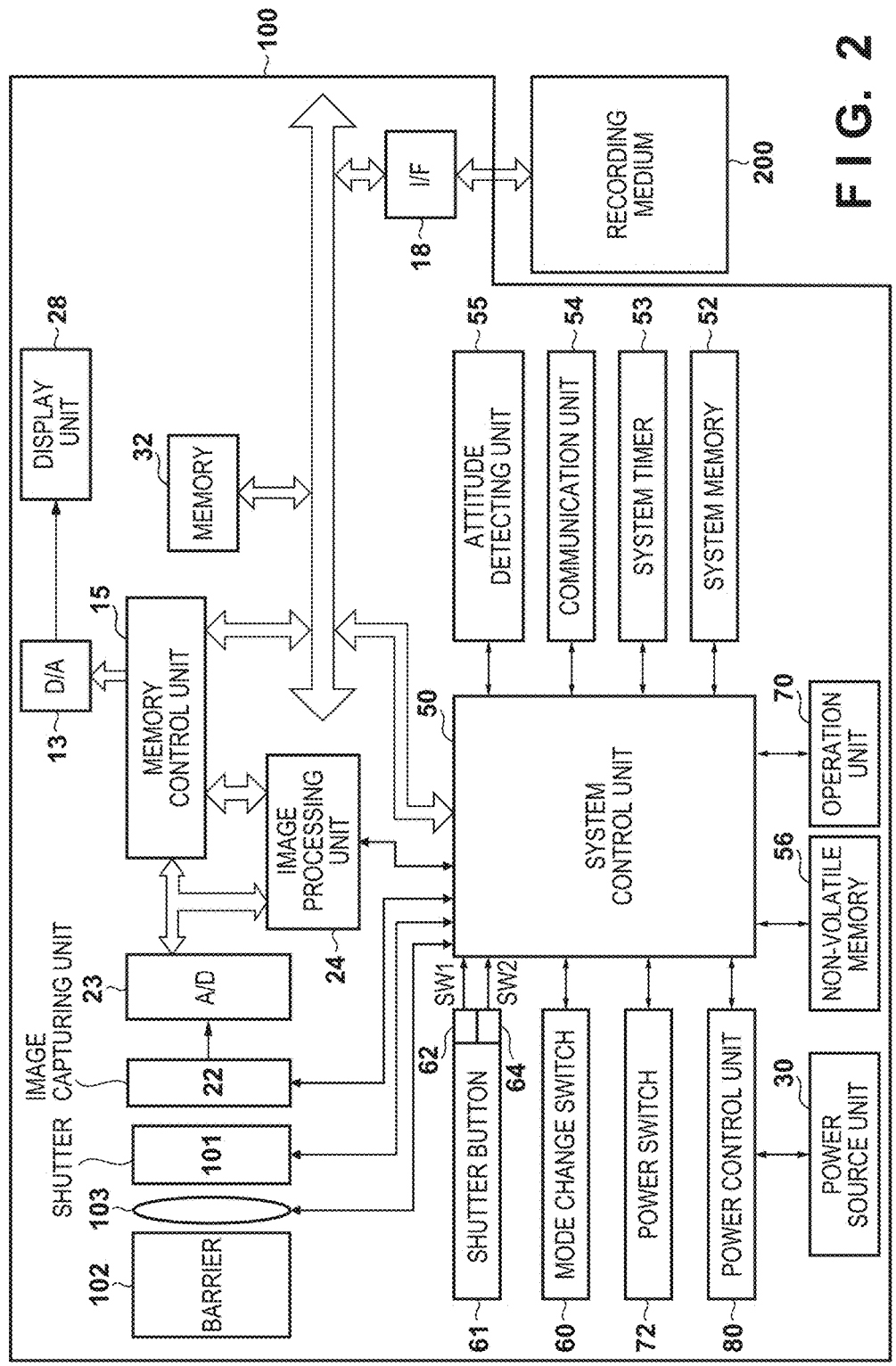
FIG. 2 is a block diagram illustrating an example of the configuration of the digital camera 100.

Embodiments of the present invention will now be described with reference to the attached drawings. It should be noted that the technical scope of the present invention is defined by the claims, and is not limited by any of the embodiments described below. In addition, not all combinations of the features described in the embodiments are necessarily required for realizing the present invention.

First Embodiment

FIG. 1 is an external view of a digital camera 100 serving as an example of an image processing apparatus. In FIG. 1, a display unit 28 is a display unit that displays images, various types of information, and so on. A shutter button 61 is an operation unit for making an image capture instruction. A mode change switch 60 is an operation unit for switching among various types of modes. A connector 112 is a connector that connects the digital camera 100 to a connection cable 111 for connecting to an external device such as a personal computer or a printer. An operation unit 70 is an operation unit constituted of operating members such as various types of switches, buttons, a touch panel, and so on that accept various types of operations from a user. A controller wheel 73 is an operating member, included in the operation unit 70, that can be rotationally manipulated. A power switch 72 is a pushbutton for switching the power on and off. A recording medium 200 is a recording medium such as a memory card, a hard disk, or the like. A recording medium slot 201 is a slot for holding the recording medium 200. The recording medium 200 held in the recording medium slot 201 can communicate with the digital camera 100, which makes recording and playback possible. A cover 202 is a cover for the recording medium slot 201. FIG. 1 illustrates a state in which the cover 202 is open and the recording medium 200 is partially removed and exposed from the recording medium slot 201.

FIG. 2 is a block diagram illustrating an example of the configuration of the digital camera 100. In FIG. 2, an image capturing lens 103 corresponds to a lens group including a zoom lens and a focus lens. A shutter 101 is a shutter having an aperture function. An image capturing unit 22 is an image sensor constituted of a CCD, a CMOS sensor, or the like that converts an optical image into an electrical signal. An A/D converter 23 converts analog signals into digital signals. The A/D converter 23 is used to convert analog signals output from the image capturing unit 22 into digital signals. A barrier 102 prevents an image capturing system of the digital camera 100 including the image capturing lens 103, the shutter 101, and the image capturing unit 22 from being soiled or damaged by covering the image capturing system including the image capturing lens 103.

An image processing unit 24 carries out predetermined pixel interpolation, resizing processing such as reduction, color conversion processing, and the like on data from the A/D converter 23 or data from a memory control unit 15. The image processing unit 24 also performs predetermined computational processing using captured image data, and a system control unit 50 performs exposure control and focus control on the basis of results obtained from these computations. A TTL (through-the-lens) AF (autofocus) process, an AE (automatic exposure) process, and an EF (flash pre-emission) process are carried out as a result. The image processing unit 24 also performs predetermined computational processing using the captured image data, performing a TTL AWB (auto white balance) process on the basis of the results obtained from the computations.

Data output from the A/D converter 23 is written into a memory 32 through the image processing unit 24 and the memory control unit 15, or through the memory control unit 15. The memory 32 stores the image data obtained by the image capturing unit 22 and converted into digital data by the A/D converter 23, image data for display in the display unit 28, and the like. The memory 32 is provided with a storage capacity sufficient to store a predetermined number of still images, a predetermined time's worth of moving images and audio, and so on. The memory 32 also functions as an image display memory (a video memory).

A D/A converter 13 converts data for image display, stored in the memory 32, into an analog signal and supplies the analog signal to the display unit 28. Image data for display written into the memory 32 thus is displayed by the display unit 28 via the D/A converter 13 in this manner. The display unit 28 carries out a display in the display device, which is an LCD or the like, based on the analog signal from the D/A converter 13. By using the D/A converter 13 to convert the digital signals A/D converted by the A/D converter 23 and stored in the memory 32 into analog signals and then sequentially transferring and displaying those signals in the display unit 28, the display unit 28 functions as an electronic viewfinder (EVF). A through-the-lens image display (live view display) can be carried out as a result.

A non-volatile memory 56 is a memory serving as a recording medium that can be recorded to and erased electrically, and is constituted of an EEPROM, for example. Operational constants, programs, and so on of the system control unit 50 are stored in the non-volatile memory 56. Here, "programs" refers to computer programs for executing the various flowcharts according to the present embodiment, which will be described later.

The system control unit 50 is a control unit having at least one processor, and controls the digital camera 100 as a whole. The system control unit 50 realizes the processes according to the present embodiment, mentioned later, by executing programs recorded in the non-volatile memory 56 mentioned above. RAM is used for a system memory 52. Operational constants and variables of the system control unit 50, programs read out from the non-volatile memory 56, and so on are loaded into the system memory 52. The system control unit 50 also carries out display control by controlling the memory 32, the D/A converter 13, the display unit 28, and so on.

A system timer 53 is a timer unit that measures times used in various types of control, measures the time of an internal clock, and so on. The mode change switch 60, the shutter button 61, and the operation unit 70 are operation units for inputting various types of operation instructions (user instructions) to the system control unit 50. The mode change switch 60 switches an operating mode of the system control unit 50 among a still image recording mode, a moving image capturing mode, a playback mode, and so on. An auto capturing mode, an auto scene judgment mode, a manual mode, an aperture priority mode (Av mode), and a shutter speed priority mode (Tv mode) are examples of modes included in the still image recording mode. There are also various scene modes serving as image capturing settings for different image capturing scenes, a program AE mode, a custom mode, and so on. Any one of these modes can be directly switched to using the mode change switch 60. Alternatively, the mode change switch 60 may be used to switch to a screen displaying a list of the image capturing modes, after which one of the displayed modes is selected and then switched to using another operating member. Likewise, the moving image capturing mode may also include a plurality of modes.

A first shutter switch 62 switches on partway through the manipulation of the shutter button 61 provided in the digital camera 100, or in other words, when the button is depressed halfway (an image capturing preparation instruction), and produces a first shutter switch signal SW1. The system control unit 50 starts operations such as AF (autofocus) processing, AE (automatic exposure) processing, AWB (auto white balance) processing, and EF (flash pre-emission) processing in response to the first shutter switch signal SW1.

A second shutter switch 64 turns on when the shutter button 61 is completely manipulated, or in other words, is fully depressed (an image capture instruction), and produces a second shutter switch signal SW2. The system control unit 50 starts a series of image capturing processes, from reading out signals from the image capturing unit 22 to writing an image into the recording medium 200, in response to the second shutter switch signal SW2.

The following processes are carried out in the image capturing processes started in response to the second shutter switch signal SW2. First, exposure is carried out according to a set exposure time, and the image capturing unit 22 captures an image. A signal of the image captured by the image capturing unit 22 is converted into a digital signal by the A/D converter 23, and is stored in the memory 32 as a RAW image. Using the image processing unit 24, the system control unit 50 carries out a developing process (an image capturing developing process), including a filtering process, a color adjustment process based on information such as white balance and autofocus, and so on, on the RAW image stored in the memory 32. The developed image (YUV data) obtained from the developing process performed by the image processing unit 24 is once again stored in the memory 32, and the image processing unit 24 then carries out JPEG compression to generate a JPEG image. As an image capturing setting, there is a setting for storing both a RAW image and a JPEG image (RAW+JPEG). In the case where this setting is used, the system control unit 50 records the RAW image stored in the memory 32 as a RAW image file and the generated JPEG image as a JPEG file in the recording medium 200. However, in the case where a setting for storing only a JPEG image is used as the image capturing setting, the system control unit 50 records the generated JPEG image in the recording medium 200 as a JPEG file, without recording the RAW image stored in the memory 32. Likewise, in the case where a setting for storing only a RAW image is used as the image capturing setting, the system control unit 50 records the RAW image stored in the memory 32 as a RAW image file in the recording medium 200. Developing parameters used in the image capturing developing process (called simply "parameters" hereinafter), ID information of the digital camera that captured the image, setting information of the digital camera that captured the image, and so on are stored as attribute information in the RAW image file. Additionally, the generated JPEG image is recorded in the RAW image file in order to make it easy to confirm the RAW image. The JPEG image recorded in the RAW image file in order to make it easy to confirm the RAW image will be referred to as a "display JPEG".

Functions relevant for different situations are assigned to the operating members in the operation unit 70, which then act as various types of function buttons, by making an operation for selecting various types of function icons displayed in the display unit 28. An end button, a return button, a next image button, a jump button, a sort button, an attribute change button, and so on are examples of the function buttons. For example, a menu screen in which various types of settings can be made is displayed in the display unit 28 when a menu button is pressed. A user can make various types of settings intuitively using the menu screen displayed in the display unit 28, four (up, down, left, and right) directional buttons, a SET button, and so on. Note that the digital camera 100 may include a touch panel capable of detecting touch operations made on the display unit 28 (a touch-based operating member) as part of the operation unit 70. The controller wheel 73 is an operating member, included in the operation unit 70, that can be rotationally manipulated, and is used along with the directional buttons when specifying items to be selected and so on.

A power control unit 80 is constituted of a battery detection circuit, a DC-DC converter, switch circuits for switching the blocks through which power passes, and so on, and detects whether or not a battery is connected, the type of the battery, the remaining battery power, and so on. The power control unit 80 also controls the DC-DC converter based on the detection results and instructions from the system control unit 50, and supplies a necessary voltage for a necessary period to the various units, including the recording medium 200.

A power source unit 30 is a primary battery such as an alkali battery, a lithium battery, or the like, a secondary battery such as a NiCd battery, a NiMH battery, a Li battery, or the like, an AC adapter, and so on. A recording medium I/F 18 is an interface for the recording medium 200 such as a memory card, a hard disk, or the like. The recording medium 200 is a recording medium for recording captured images, such as a memory card, and is constituted of a semiconductor memory, an optical disk, a magnetic disk, or the like.

A communication unit 54 connects to an external device wirelessly or over a hard-wire cable, and sends and receives video signals, audio signals, and the like. The communication unit 54 is also capable of connecting to a wireless local area network (LAN), the Internet, and so on. The communication unit 54 is capable of sending images captured by the image capturing unit 22 (including a through-the-lens image), images recorded in the recording medium 200, and so on, and can also receive images, other various types of information, and so on from an external device.

An attitude detecting unit 55 detects an attitude of the digital camera 100 relative to the direction of gravity. On the basis of the attitude detected by the attitude detecting unit 55, the system control unit 50 can determine whether an image captured by the image capturing unit 22 is an image captured when the digital camera 100 is oriented horizontally or an image captured when the digital camera 100 is oriented vertically. The system control unit 50 can attach orientation information, based on the attitude detected by the attitude detecting unit 55, to the image file of the image captured by the image capturing unit 22, record the image having rotated the image on the basis of the attitude, and so on. An accelerometer, a gyrosensor, or the like can be used as the attitude detecting unit 55.

Figure 3:
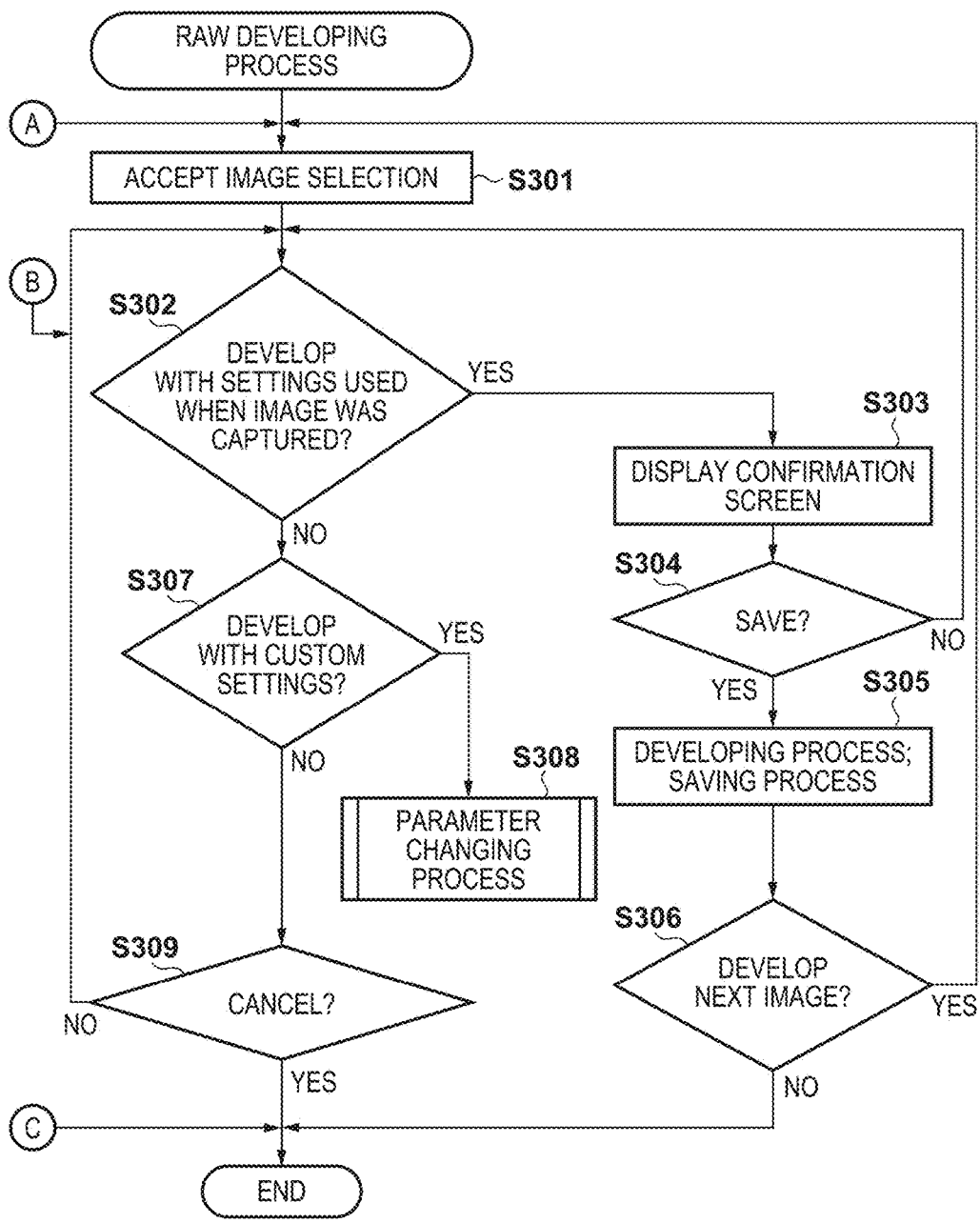
FIG. 3 is a flowchart illustrating a RAW developing process.

FIG. 3 is a flowchart illustrating a RAW developing process carried out by the digital camera 100. This process starts when the digital camera 100 is started up, the menu screen is displayed, and a "RAW developing" menu item is selected from a list of displayed menu items. This processing is realized by the system control unit 50 loading a program recorded in the non-volatile memory 56 into the system memory 52 and executing that program.

In step S301, the system control unit 50 accepts an image selection from the user. Specifically, the system control unit 50 displays a RAW image from among the images recorded in the recording medium 200. Here, "displaying a RAW image" means displaying the display JPEG recorded in the RAW image file. However, in the case of a RAW image file that does not have a display JPEG, the system control unit 50 may instead display the RAW image by carrying out a developing process according to the settings from when the image was captured (that is, the parameters recorded in the RAW image file). Alternatively, the system control unit 50 may display the RAW image by carrying out a developing process according to predetermined parameters recorded in the non-volatile memory 56 of the digital camera 100. The system control unit 50 then accepts an operation from the user for selecting the image. When displaying the RAW image, one image may be displayed (a single display), or a list of a plurality of RAW images may be displayed (a multiple display). The digital camera 100 may be configured to switch between the single display and the multiple display in response to user operation. In the case of the single display, the user selects the desired RAW image by using the left and right directional keys of the four directional keys included in the operation unit 70 to move forward and backward through the images. In the case of the multiple display, the user selects the desired image by using the four directional keys included in the operation unit 70 to move an image selection cursor. When the SET button included in the operation unit 70 is pressed while the desired image is selected, the system control unit 50 displays a developing method selection screen. Three options, namely "develop using image capturing settings", "develop using custom settings", and "cancel", are displayed in the developing method selection screen. The user can select one of the three options by manipulating the four directional buttons to select one of the three options and then pressing the SET button. The process advances to step S302 once the system control unit 50 has displayed the developing method selection screen.

In step S302, the system control unit 50 determines whether or not the SET button has been pressed with "develop using image capturing settings" selected in the developing method selection screen. In the case where the SET button has been pressed with "develop using image capturing settings" selected, the process advances to step S303. When such is not the case, however, the process advances to step S307.

In step S303, the system control unit 50 displays, in the display unit 28, a confirmation screen including a confirmation message reading "develop and save?" along with options reading "yes" and "no". An inquiry as to whether it is okay to carry out the developing process using the settings from when the image was captured (in other words, the parameters recorded in the RAW image file) may be displayed in the confirmation message.

In step S304, the system control unit 50 determines whether "yes", instructing the image to be saved, or "no", has been selected from the options displayed in the confirmation screen. In the case where "yes" has been selected, the process advances to step S305, whereas in the case where "no" has been selected, the process returns to step S302.

In step S305, the system control unit 50 uses the image processing unit 24 to carry out a developing process using the settings from when the image was captured (in other words, the parameters recorded in the RAW image file). The system control unit 50 carries out JPEG compression on YUV data generated as a result of the RAW developing, and records the resulting file as a JPEG image file in the recording medium 200. The JPEG image file recorded here has basically the same image quality as the display JPEG in the RAW image file serving as the basis of the developing.

In step S306, the system control unit 50 displays a confirmation message inquiring whether another image is to be developed, and determines whether or not an operation instructing another image to be developed has been made. In the case where an operation instructing another image to be developed has been made, the process returns to step S301. However, when such is not the case, the RAW developing process illustrated in the flowchart ends, and the system control unit 50 returns the display unit 28 to the menu screen.

In step S307, the system control unit 50 determines whether or not the SET button has been pressed with "develop using custom settings" selected in the developing method selection screen. In the case where the SET button has been pressed with "develop using custom settings" selected, the process advances to step S308. When such is not the case, however, the process advances to step S309.

In step S308, the system control unit 50 carries out a parameter changing process. The parameter changing process will be described in detail later using FIGS. 4A and 4B.

In step S309, the system control unit 50 determines whether or not the SET button has been pressed with "cancel" selected in the developing method selection screen. In the case where the SET button has been pressed with "cancel" selected, the RAW developing process illustrated in the flowchart ends, and the system control unit 50 returns the display unit 28 to the menu screen. When such is not the case, the process returns to step S302, where the system control unit 50 stands by for a selection operation from the user in the developing method selection screen.

Figure 4B:
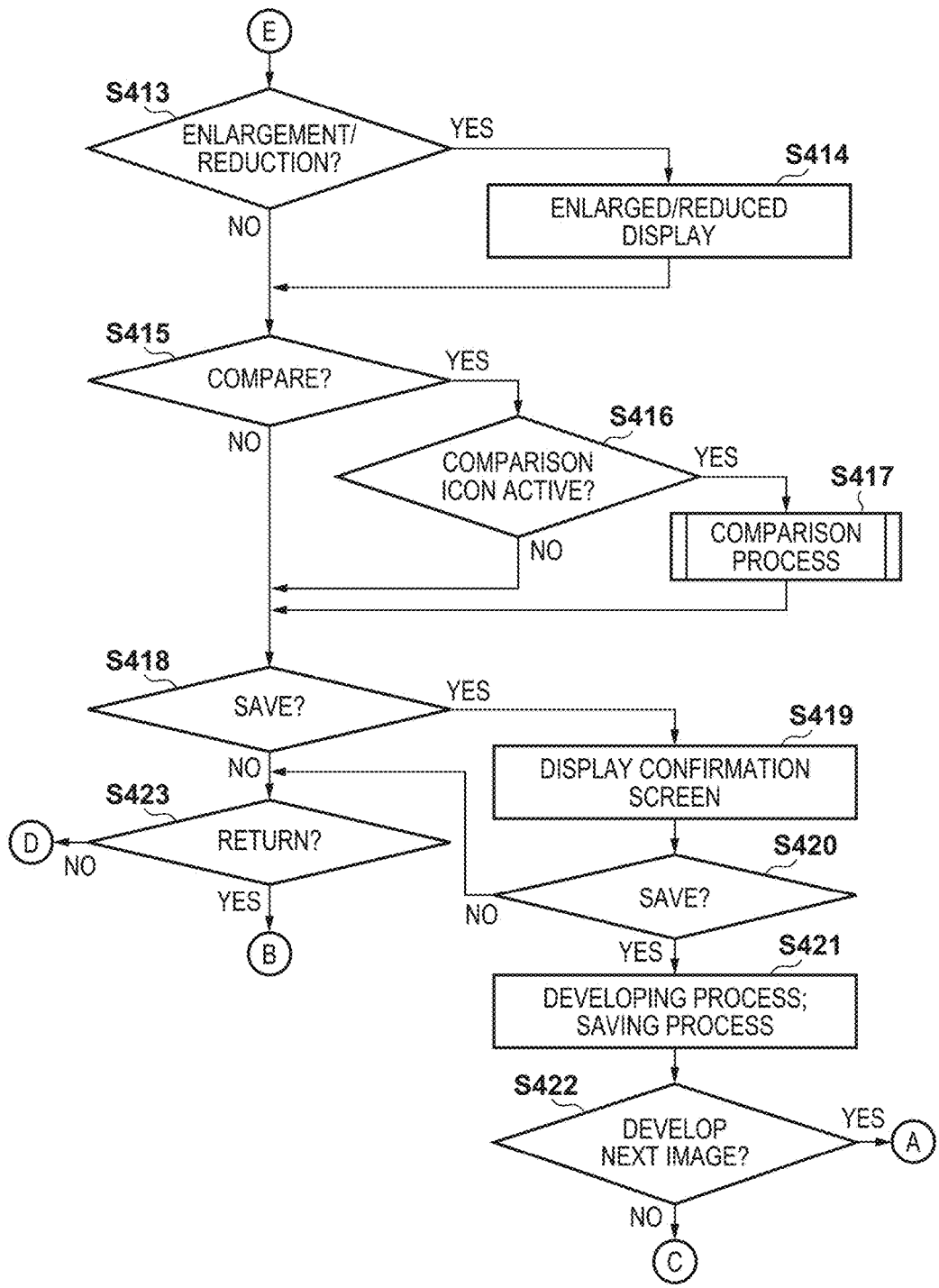

FIGS. 4A and 4B are flowcharts illustrating the parameter changing process (step S308) carried out by the digital camera 100. This process is the specific processing carried out in step S308 of FIG. 3, mentioned above. This processing is realized by the system control unit 50 loading a program recorded in the non-volatile memory 56 into the system memory 52 and executing that program.

In step S401, the system control unit 50 uses the image processing unit 24 to carry out a developing process, on the RAW image selected in step S301 of FIG. 3, using the settings from when the image was captured (in other words, the parameters recorded in the RAW image file). A developed image is generated as a result. The system control unit 50 also stores parameters obtained from the RAW image file (that is, the parameters used in the developing process) in the system memory 52.

Figure 6A:
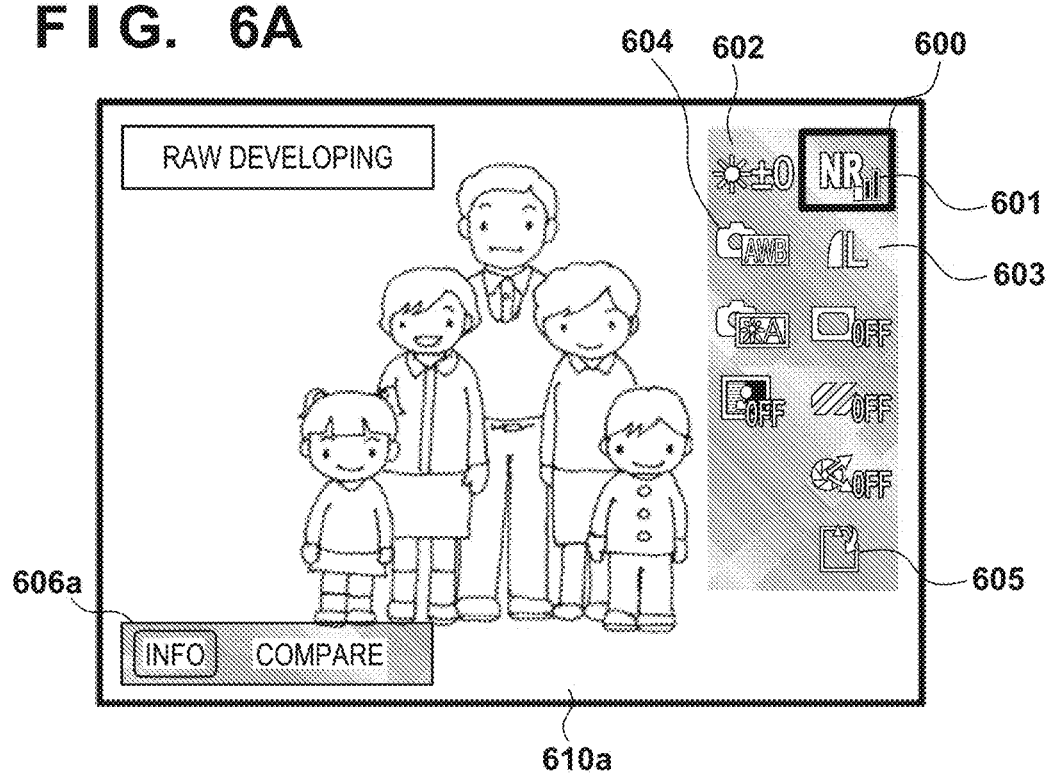
FIG. 6A is a diagram illustrating an example of the display of a parameter adjustment screen (before changing parameters).

In step S402, the system control unit 50 displays, in the display unit 28, a parameter adjustment screen including the developed image and a plurality of display items for adjusting the parameters. FIG. 6A illustrates an example of the parameter adjustment screen. Display items 601 to 604 for adjusting various parameters, a save icon 605, a compare icon 606a, and so on are displayed superimposed over a developed image 610a. The display item 601 is an icon for adjusting noise reduction, which is one of the parameters. The display item 602 is an icon for adjusting brightness, which is one of the parameters. The display item 603 is an icon for adjusting a number of recorded pixels (image size), which is one of the parameters (a first parameter). The display item 604 is an icon for adjusting white balance (WB), which is one of the parameters (a second parameter). The display items also indicate current setting values. By manipulating the controller wheel 73 included in the operation unit 70 while one of the display items is selected by a cursor 600, the user can change the parameter corresponding to the selected display item. Additionally, by pressing the SET button while one of the display items is selected by the cursor 600, the user can cause a screen for changing the parameter corresponding to the selected display item to be displayed, and can then change the parameter by manipulating the operation unit 70 in that state. The compare icon 606a is a display item for comparing pre- and post-adjustment images. In an initial state, the compare icon 606a is grayed out to indicate that the icon is inactive, and becomes active in the case where a parameter aside from the number of recorded pixels has been changed.

In step S403, the system control unit 50 determines whether or not the display item 604 has been selected by the cursor 600 and an operation for changing the WB has been made. In the case where an operation for changing the WB has been made, the process advances to step S404. However, when such is not the case, the process advances to step S405.

Figure 6B:
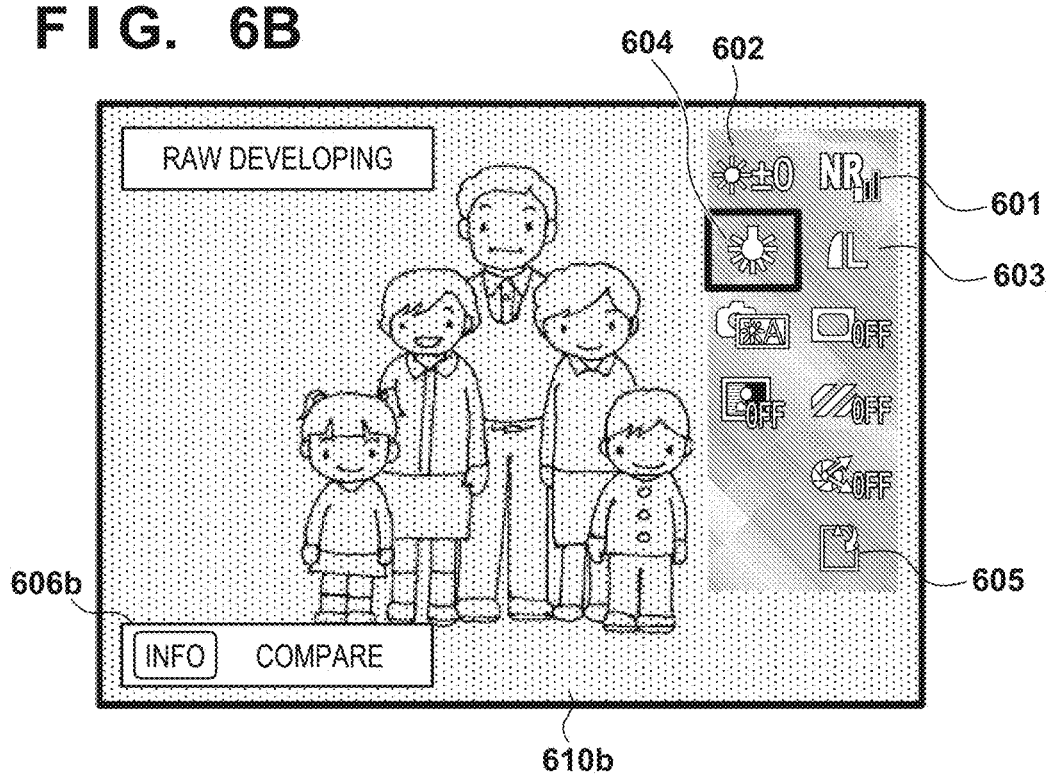
FIG. 6B is a diagram illustrating an example of the display of the parameter adjustment screen (after changing the WB).

In step S404, the system control unit 50 updates the WB setting value, in the parameters stored in the system memory 52, to the changed WB setting value. Then, in step S409, the system control unit 50 develops the RAW image selected in step S301 of FIG. 3 on the basis of the parameters stored in the system memory 52 (including the changed WB setting value). In step S410, the system control unit 50 displays the image obtained from the developing carried out in step S409. For example, in the case where an operation for changing the WB has been made in the state illustrated in FIG. 6A, the display unit 28 is changed to the display state illustrated in FIG. 6B. In FIG. 6B, the display item 604 indicates the changed WB setting value (in this example, the value is changed from "auto WB (AWB)" in FIG. 6A to "incandescent"). An image 610b displayed as illustrated in FIG. 6B is a developed image corresponding to the result of changing the WB setting to "incandescent" and developing the image. Furthermore, the compare icon 606a is activated as a result of the process of step S412, which will be mentioned later, and is thus changed to a compare icon 606b.

In step S405, the system control unit 50 determines whether or not the display item 603 has been selected by the cursor 600 and an operation for changing the number of recorded pixels has been made. In the case where an operation for changing the number of recorded pixels has been made, the process advances to step S406. However, when such is not the case, the process advances to step S407.

Figure 6C:
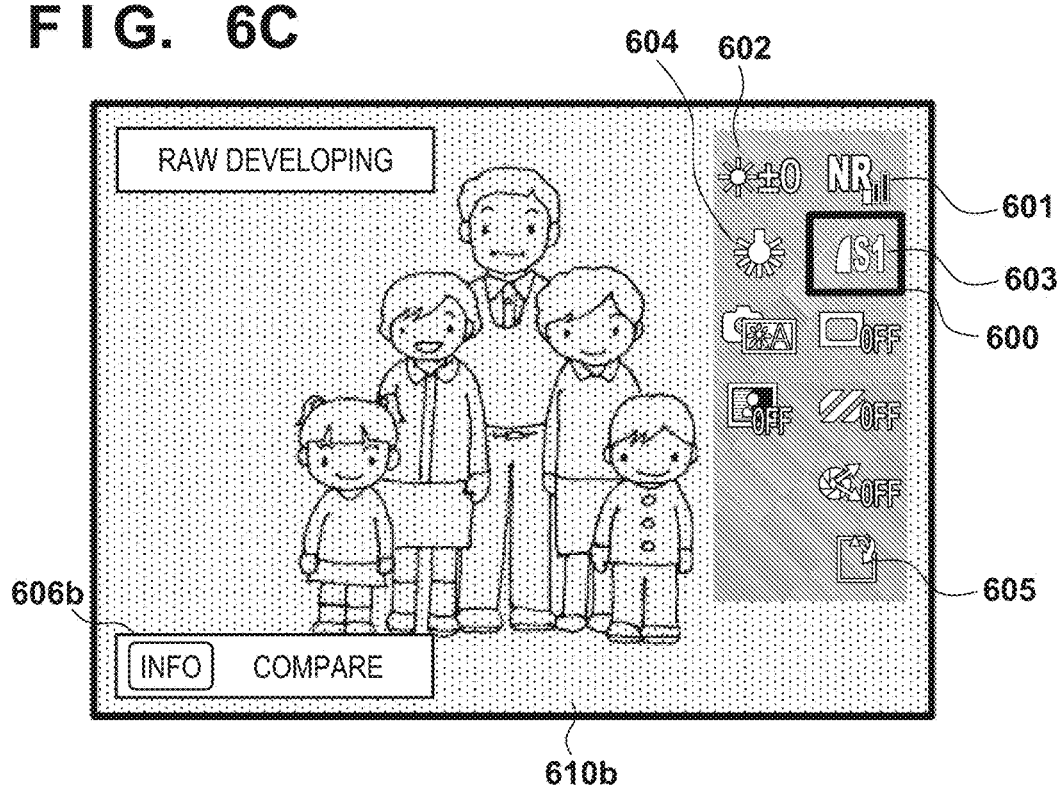
FIG. 6C is a diagram illustrating an example of the display of the parameter adjustment screen (after changing the WB and the number of recorded pixels).

In step S406, the system control unit 50 updates the number of recorded pixels, in the parameters stored in the system memory 52, to the changed number of recorded pixels. Then, in step S409, the system control unit 50 develops the RAW image selected in step S301 of FIG. 3 on the basis of the parameters stored in the system memory 52 (including the changed number of recorded pixels). In step S410, the system control unit 50 displays the image obtained from the developing carried out in step S409. For example, in the case where an operation for changing the number of recorded pixels has been made in the state illustrated in FIG. 6B, the display unit 28 is changed to the display state illustrated in FIG. 6C. In FIG. 6C, the display item 603 indicates the changed number of recorded pixels. In the present embodiment, in the case where the aspect ratio is 3:2, L corresponds to 4500×3000 pixels, M1 corresponds to 3000×2000 pixels, M2 corresponds to 2400×1600 pixels, S1 corresponds to 1580×1080 pixels, and S2 corresponds to 720×480 pixels. Even with other aspect ratios, L, M1, M2, S1, and S2 are assumed to have pixel numbers similar to those mentioned here. In the example illustrated in FIG. 6C, the number of recorded pixels is changed from L, namely 4500×3000 pixels, in FIG. 6B, to S1, namely 1580×1080 pixels. Additionally, the image 610b displayed as illustrated in FIG. 6C is a developed image corresponding to the result of changing the setting for the number of recorded pixels to S1, namely 1580×1080 pixels, and developing the image.

In step S407, the system control unit 50 determines whether or not another display item has been selected by the cursor 600 and an operation for changing another parameter has been made. In the case where an operation for changing another parameter has been made, the process advances to step S408. However, when such is not the case, the process advances to step S413.

In step S408, the system control unit 50 updates the changed parameter, in the parameters stored in the system memory 52, to the changed setting value. Then, in step S409, the system control unit 50 develops the RAW image selected in step S301 of FIG. 3 on the basis of the parameters stored in the system memory 52 (including the changed parameter). In step S410, the system control unit 50 displays the image obtained from the developing carried out in step S409. At this time, the system control unit 50 changes the display item to a display state indicating the changed parameter. The user can therefore confirm the result of the adjustment.

In step S411, the system control unit 50 determines whether or not a parameter aside from the number of recorded pixels has been changed from an initial value (the parameter used when capturing the image, applied in step S401). In the case where a parameter aside from the number of recorded pixels has been changed from the initial value, the process advances to step S412. However, when such is not the case (in other words, in the case where only the number of recorded pixels has been changed), the process returns to step S403.

In step S412, the system control unit 50 changes the display state of the compare icon displayed in the parameter adjustment screen to a display state indicating that the icon is active. As a result, the compare icon 606*a* that was grayed out as indicated in FIG. 6A is changed to the compare icon 606*b* as indicated in FIG. 6B, which is a display state indicating that the icon is active.

Meanwhile, in step S413, the system control unit 50 determines whether or not there has been an operation for enlarging/reducing the image. The enlarging/reducing operation can be carried out by manipulating an enlarge button or a reduce button included in the operation unit 70, or by making a pinch operation on a touch panel provided integrally with the display unit 28. "Pinch operation" refers to an operation in which the touch panel is touched at two points simultaneously, and the points are then distanced from each other (pinch-out, resulting in an enlargement operation) or are brought closer to each other (pinch-in, resulting in a reduction operation).

In step S414, the system control unit 50 enlarges or reduces the developed image displayed in the parameter adjustment screen in accordance with the enlargement/reduction operation accepted in step S413.

In step S415, the system control unit 50 determines whether or not a comparison instruction operation has been made by pressing an INFO button included in the operation unit 70 or by touching the compare icons 606*a* and 606*b*. In the case where a comparison instruction operation has been made, the process advances to step S416. However, when such is not the case, the process advances to step S418.

In step S416, the system control unit 50 determines whether or not the compare icon is active (in other words, whether or not the compare icon 606*b* is displayed). In the case where the compare icon is active, the process advances to step S417. However, when such is not the case (in other words, in the case where the compare icon 606*a*, which is displayed in the state indicating that the icon is inactive, is displayed), the process advances to step S418.

In step S417, the system control unit 50 carries out a comparison process for comparing the images from before and after the parameter adjustment carried out in the parameter changing process. The comparison process will be described in detail later using FIG. 5.

In step S418, the system control unit 50 determines whether or not a save instruction operation has been made by touching the save icon 605, which is used to instruct an image to be saved, or by selecting the save icon 605 with the cursor 600 and pressing the SET button. In the case where a save instruction operation has been made, the process advances to step S419. However, when such is not the case, the process advances to step S423.

In step S419, the system control unit 50 displays, in the display unit 28, the confirmation screen including a confirmation message reading "develop and save?" along with options reading "yes" and "no".

In step S420, the system control unit 50 determines whether "yes", instructing the image to be saved, or "no", has been selected from the options displayed in the confirmation screen. In the case where "yes" has been selected, the process advances to step S421, whereas in the case where "no" has been selected, the process advances to step S423.

In step S421, the system control unit 50 uses the image processing unit 24 to carry out a developing process on the selected RAW image, by applying the parameters stored in the system memory 52 and adjusted in the parameter changing process. This developing process is a final developing, rather than the developing process used for preview purposes carried out in step S409. The system control unit 50 carries out JPEG compression on YUV data generated as a result of the RAW developing, and records the resulting file as a JPEG image file in the recording medium 200. The JPEG file recorded here reflects the adjustments made to the various parameters in the parameter changing process, and thus basically has different image quality from the display JPEG of the RAW image file serving as the basis of the developing.

In step S422, the system control unit 50 displays a confirmation message inquiring whether another image is to be developed, and determines whether or not an operation instructing another image to be developed has been made. In the case where an operation instructing another image to be developed has been made, the process returns to step S301. However, when such is not the case, the RAW developing process (FIG. 3) including the parameter changing process (FIGS. 4A and 4B) ends, and the system control unit 50 returns the display unit 28 to the menu screen.

In step S423, the system control unit 50 determines whether or not an operating member specifying a return operation included in the operation unit 70 (the menu button, for example) has been pressed. In the case where the operating member specifying a return operation has been pressed, the process returns to step S302 in FIG. 3. However, when such is not the case, the process returns to step S402. In the case where the process returns to step S302 of FIG. 3 from step S423, the system control unit 50 once again displays the developing method selection screen.

Figure 5:
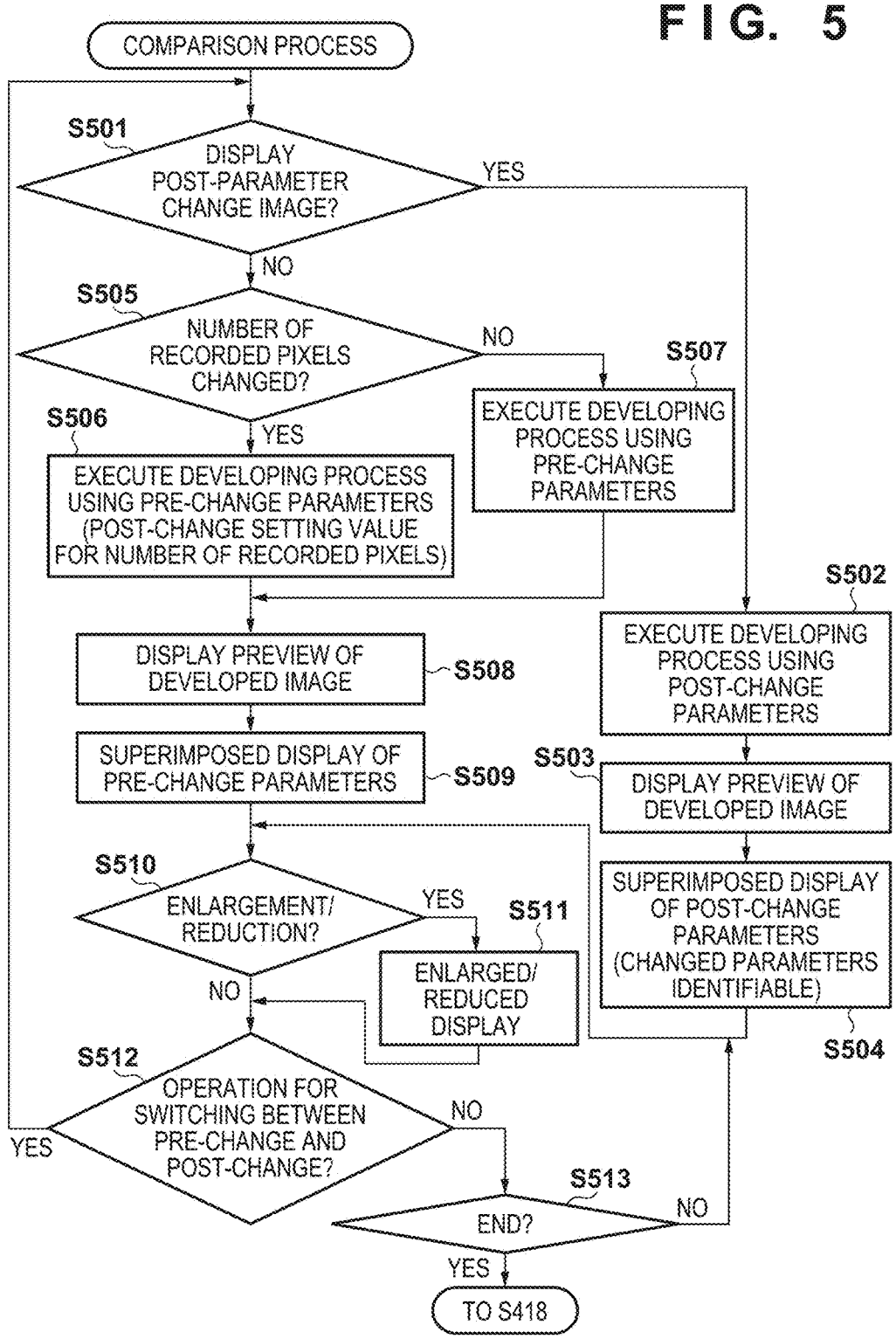
FIG. 5 is a flowchart illustrating a comparison process (step S417).

FIG. 5 is a flowchart illustrating the comparison process (step S417) carried out by the digital camera 100. This processing is realized by the system control unit 50 loading a program recorded in the non-volatile memory 56 into the system memory 52 and executing that program. The comparison process will be described using FIGS. 5 and 6C to 6G.

In step S501, the system control unit 50 determines whether or not the image displayed in the display unit 28 is a post-parameter change image. The process transits to step S501 for the first time in response to the compare icon 606b being pressed by the user immediately before, and thus the post-parameter change image is displayed. In the case where the displayed image is the post-parameter change image, the process advances to step S502. However, in the case where the displayed image is a pre-parameter change image (in other words, in the case where the image is to be developed using the parameters set when the image was captured), the process advances to step S505.

Figure 6D:
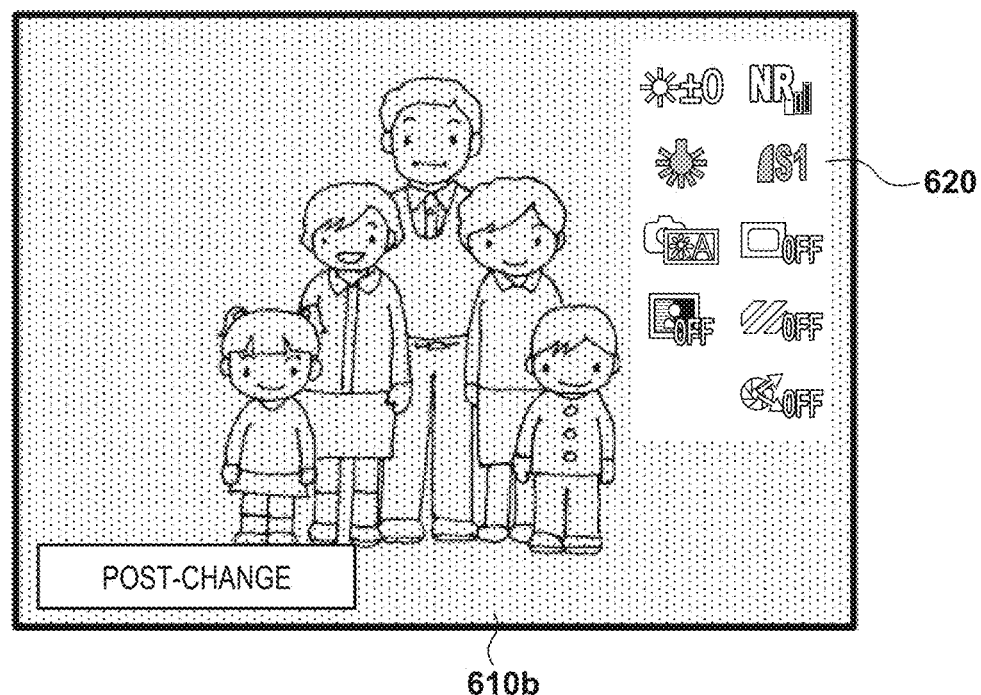
FIG. 6D is a diagram illustrating an example of the display of a post-parameter change image in a comparison screen.

In step S502, the system control unit 50 generates a preview image corresponding to the post-parameter change image (a first image) by developing the RAW image (the original image) using the changed parameters. In step S503, the system control unit 50 displays the preview image in the display unit 28. In step S504, the system control unit 50 displays an icon group, indicating the parameters that can be adjusted by the user in the parameter changing process, superimposed over the preview image displayed in step S503. As a result, the post-parameter change image is displayed in the comparison screen. FIG. 6D is a diagram illustrating an example of the display of the post-parameter change image in the comparison screen. FIG. 6D is an example of a display in the case where the comparison instruction operation has been made in the display state illustrated in FIG. 6C. The image 610b is an image developed according to the changed parameters. Parameters that have been changed from their initial settings are displayed in a parameter group 620 in an identifiable manner (in orange, for example). In the example illustrated in FIG. 6D, the display item indicating the number of recorded pixels and the display item indicating the WB setting value are displayed using a different color from the other display items, and can therefore be understood as having been changed from their initial settings.

In step S505, the system control unit 50 determines whether or not the number of recorded pixels, in the various parameters, has been changed from the setting used when the image was captured. In the case where the number of recorded pixels has been changed, the process advances to step S506. However, when such is not the case, the process advances to step S507.

In step S506, the system control unit 50 carries out the developing process using the pre-change parameters (the parameters used when the image was captured), but for the number of recorded pixels, uses the post-change number of recorded pixels in the developing process. A preview image corresponding to the pre-parameter change image (a second image) is generated as a result.

In step S507, the system control unit 50 carries out the developing process using the pre-change parameters (the parameters used when the image was captured), and generates a preview image corresponding to the pre-parameter change image.

Figure 6E:
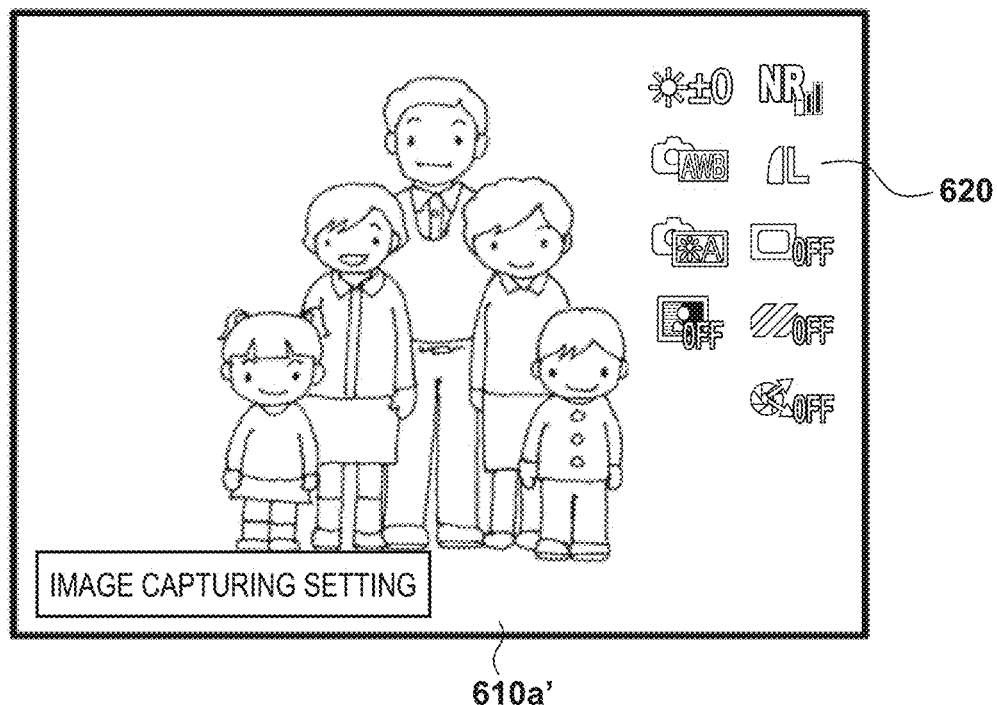
FIG. 6E is a diagram illustrating an example of the display of a pre-parameter change image in the comparison screen.

In step S508, the system control unit 50 displays the preview image generated in step S506 or step S507 in the display unit 28. In step S509, the system control unit 50 displays an icon group, indicating the parameters that can be adjusted by the user in the parameter changing process, in the same manner as in step S504. FIG. 6E is a diagram illustrating an example of the display of the pre-parameter change image in the comparison screen. FIG. 6E is an example of a display in the case where a switching operation (described later) has been made in the display state illustrated in FIG. 6D. An image 610a' is a developed image obtained by carrying out the developing process on the RAW image using the post-change setting value for the number of recorded pixels (S1, namely 1580×1080 pixels) and the pre-change setting values for the other parameters. Instead of the parameters used to generate the image 610a', the parameters used when the image was captured are displayed in the parameter group 620. Accordingly, the display item corresponding to the number of recorded pixels indicates "L" rather than "S1". Additionally, unlike FIG. 6D, there are no parameters that have been changed from their initial settings in the display items, and thus a process for displaying changed parameters in an identifiable manner is not carried out. Note that in the comparison screen, the parameter of the number of recorded pixels (S1) actually used in the developing for obtaining the image 610a' differs from the setting used when the image was captured (L) displayed in the parameter group 620. Accordingly, the parameter of the number of recorded pixels may be omitted from the display in the parameter group 620 (that is, may be hidden) in order to reduce the likelihood of the user mistakenly thinking that the displayed image 610a' has been developed using the settings used when the image was captured (L).

The image 610b illustrated in FIG. 6D and the image 610a' illustrated in FIG. 6E, which are displayed in the comparison screen, are images developed with the same conditions for the number of recorded pixels, but after and before the other parameters have been changed, respectively. As such, differences in the number of recorded pixels (image size) have no effect on differences (changes) in the image quality of the image 610b and the image 610a' being compared. Accordingly, the user can accurately confirm changes in the image quality produced by adjusting the color processing parameters and the like, without any effects caused by differences in the number of recorded pixels. This effect becomes more noticeable the more the image is enlarged, which will be described later.

In step S510, the system control unit 50 determines whether or not there has been an operation for enlarging/reducing the image. The operation for enlarging/reducing the image is the same as that described earlier with reference to step S413. In the case where an operation for enlarging/reducing the image has been made, the process advances to step S511. However, when such is not the case, the process advances to step S512.

Figure 6F:
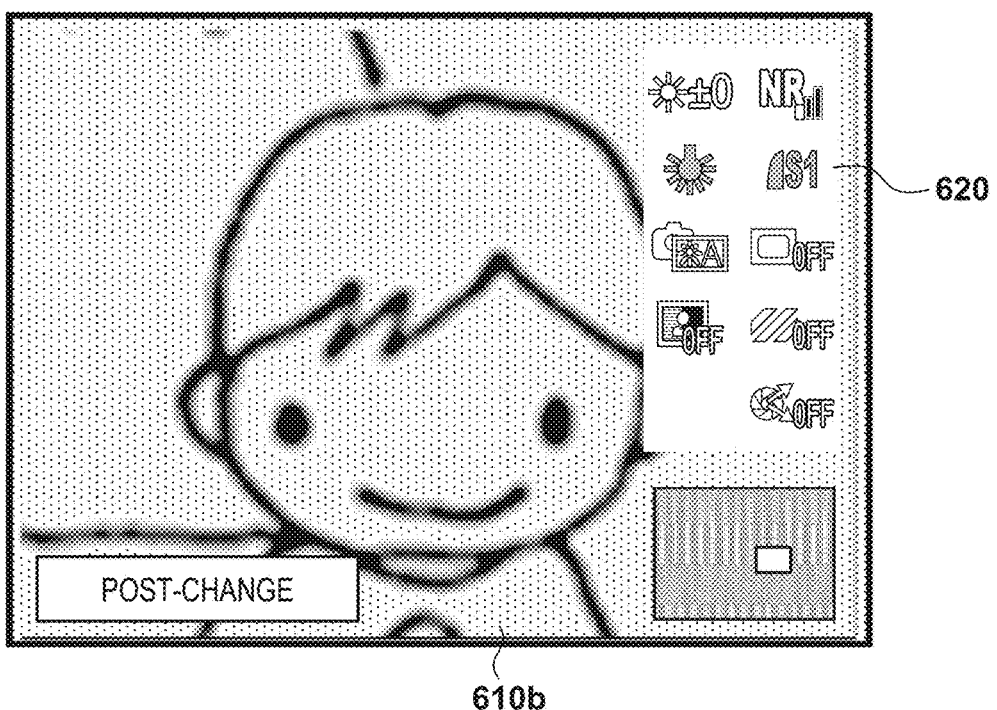
FIG. 6F is a diagram illustrating an example of the display enlarged from the state illustrated in FIG. 6D.
Figure 6G:
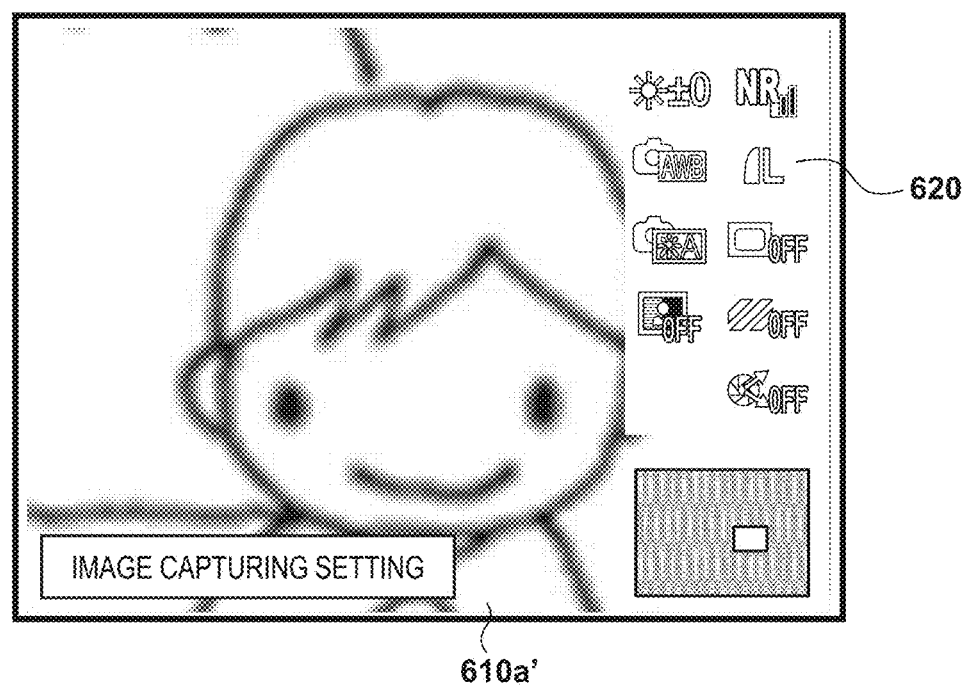
FIG. 6G is a diagram illustrating an example of the display in the case where a switching operation has been made from the state illustrated in FIG. 6F.

In step S511, the system control unit 50 enlarges or reduces the developed image displayed in the comparison screen in accordance with the enlargement/reduction operation accepted in step S510. FIG. 6F illustrates an example of the display enlarged from the state illustrated in FIG. 6D. An area displayed in an enlarged manner (an enlarged area) can be changed to any position desired by the user by manipulating the four directional keys included in the operation unit 70 or by making a touch operation. FIG. 6G, meanwhile, illustrates an example of the display in the case where a switching operation, described later with reference to step S512, has been made from the state illustrated in FIG. 6F. As indicated by the drawings, in the case where the switching operation is made while the comparison screen is in the enlarged display, the same area of the enlarged/reduced image, at the same display magnification, is displayed before and after the switch is carried out.

In step S512, the system control unit 50 determines whether or not an operation for switching between the pre-parameter change image (the settings used when the image was captured) and the post-parameter change image has been made by the user. The switching operation can be carried out by, for example, pressing the SET button included in the operation unit 70, touching a display item indicating "post-change" or "image capture settings" at the bottom-left of the comparison screen, or the like. In the case where the switching operation has been made, the process returns to step S501. However, when such is not the case, the process advances to step S513.

In step S513, the system control unit 50 determines whether or not to end the comparison process. In the case were the comparison process is not to be ended, the process returns to S510. However, in the case were the comparison process is to be ended (for example, in the case where the user has pressed the return button or the like), the process returns to step S418 in FIG. 4B.

Note that in FIG. 5, a step for determining whether or not the image is displayed in an enlarged manner at greater than or equal to a predetermined magnification may be provided immediately after a determination of "yes" in step S505. The "predetermined magnification" is, for example, the actual pixel size (that is, a state in which a single recorded pixel in the image is displayed in a single corresponding pixel of the display unit 28). In this additional step, in the case where the image is displayed in an enlarged manner at greater than or equal to the predetermined magnification, the process advances to step S506. However, when such is not the case, the process advances to step S507. To rephrase, in the case where the display magnification has been set to less than a threshold, the system control unit 50 uses the pre-change parameters for the number of recorded pixels as well when generating a pre-parameter change preview image (a third image).

Figure 7A:
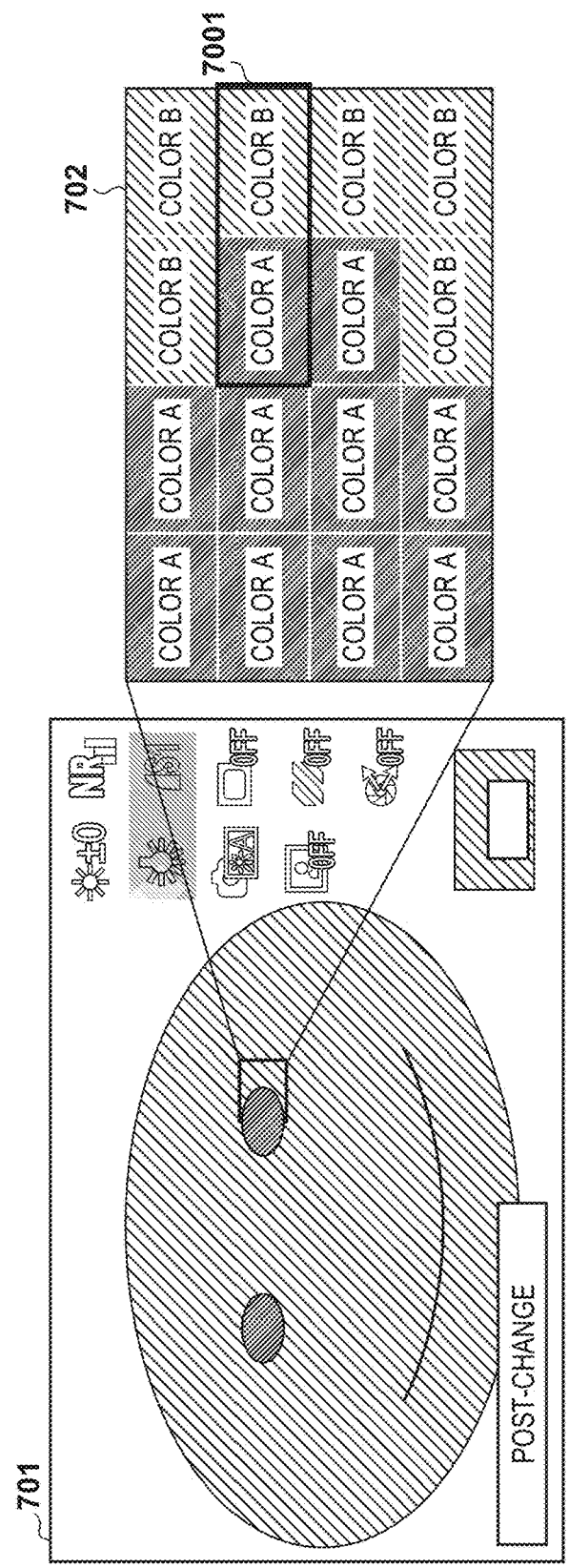
FIGS. 7A and 7B are diagrams illustrating effects of changing a WB setting value and the number of recorded pixels on the image quality.
Figure 7B:
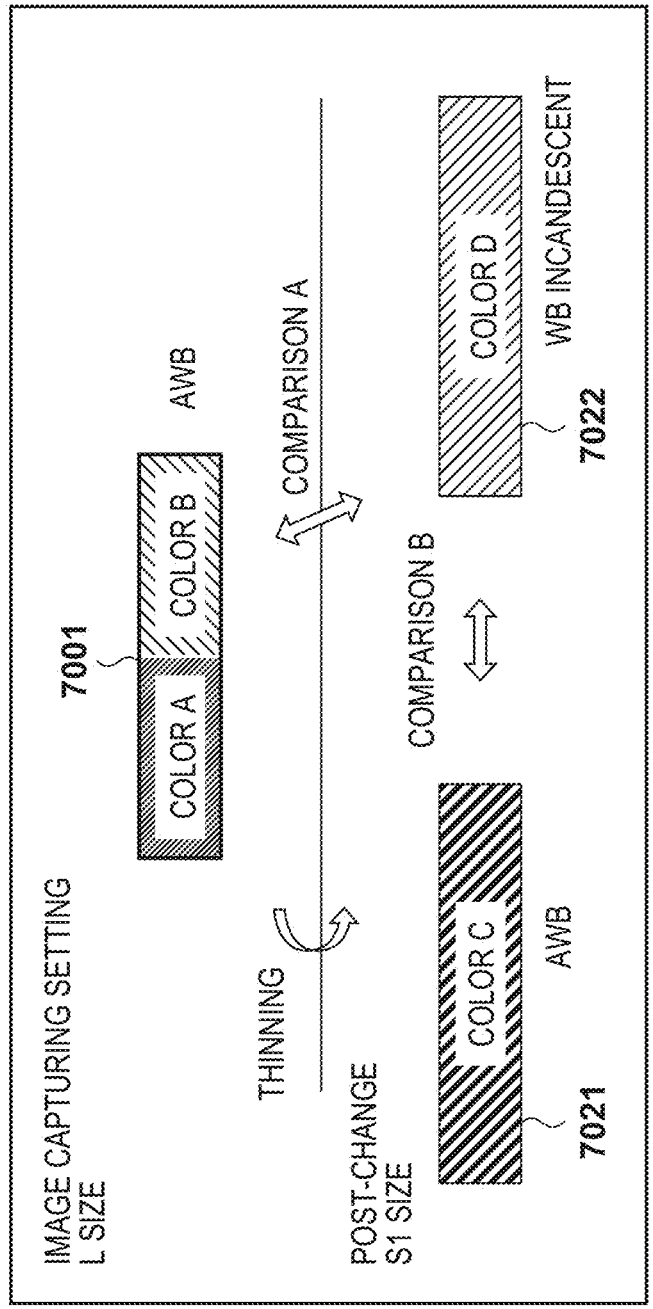

Here, additional descriptions of a reason why it is difficult to confirm the effect of changing the WB setting value on the image quality in the case where both the WB setting value and the number of recorded pixels have been changed will be given with reference to FIGS. 7A and 7B. This problem is particularly marked when confirming an image developed at the actual pixel size, and thus a case where the image is displayed at the actual pixel size in the comparison screen, as indicated by an image 701 in FIG. 7A, will be described here as an example. Looking at the area of a person's eye in the image 701 in detail at the pixel level, the area can be expressed by a color A and a color B, as indicated by a pixel group 702 (although in reality it is unnatural to express a person's eye using only two colors, such a situation is described here for the sake of simplicity). Focusing on a pixel pair 7001 in which the color A and the color B are adjacent to each other, a case where the developing process is carried out having specified desired parameters for that part will be described using FIG. 7B.

Here, it is assumed that the parameters used when the image to be developed was captured are a number of recorded pixels of "L" and a WB setting value of "auto WB (AWB)", and that the parameters changed by the user are a number of recorded pixels of "S1" and a WB setting value of "incandescent", as an example. When the pixel pair 7001 are developed by applying the post-change parameters, a color D is generated, as indicated by a pixel 7022. This color D is produced by a thinning process resulting from the process for resizing to the S1 size, and by a change in the color caused by the white balance. On the other hand, the thinning process resulting from the process for resizing to the S1 size alone will cause the color to change, and in such a case, a color C is produced, as indicated by a pixel 7021.

Here, to confirm the change in the color caused by the color adjustment (the change in the WB setting value), it is desirable to compare the pixel 7021 and the pixel 7022 (a comparison B) rather than comparing the pixel pair 7001 and the pixel 7022 (a comparison A). Accordingly, the system control unit 50 generates the preview image by carrying out the developing process using the WB setting value used when the image was captured but using the post-change setting value for the number of recorded pixels, on the pre-parameter change image (see step S506). The system control unit 50 then displays the preview image generated in this manner in the display unit 28 (see step S508). Additionally, the system control unit 50 switches the displayed image between the pre- and post-parameter change images in response to the switching operation. Doing so makes it easy for the user to judge whether a color change is produced by the change in the number of recorded pixels, or is produced by the change in the WB setting value. As a result, areas where the developing conditions (parameters) have changed become clear, making it possible for the user to carry out the developing process efficiently.

Figure 8A:
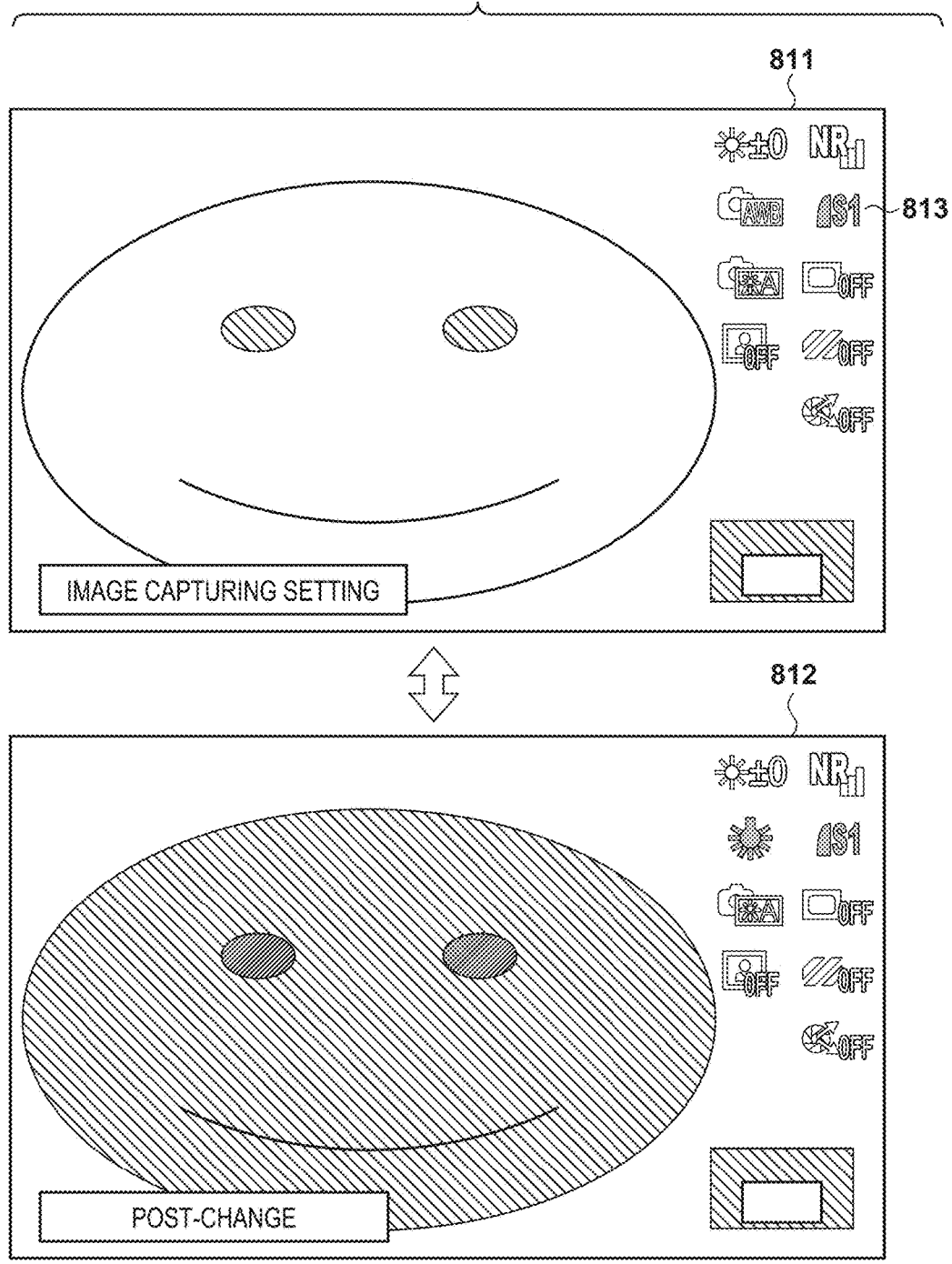
FIGS. 8A and 8B are diagrams illustrating examples of the display of parameter icons.

Meanwhile, in the case where a pre-parameter change preview image 811 is displayed in the comparison screen, the display item for the number of recorded pixels may display "S1" indicating the number of recorded pixels actually employed, as indicated in FIG. 8A (see reference numeral 813). By doing so, the user can understand that the actual number of recorded pixels is being used in the comparison (see preview images 811 and 812), which makes it possible to reduce the likelihood of user misunderstandings.

Figure 8B:
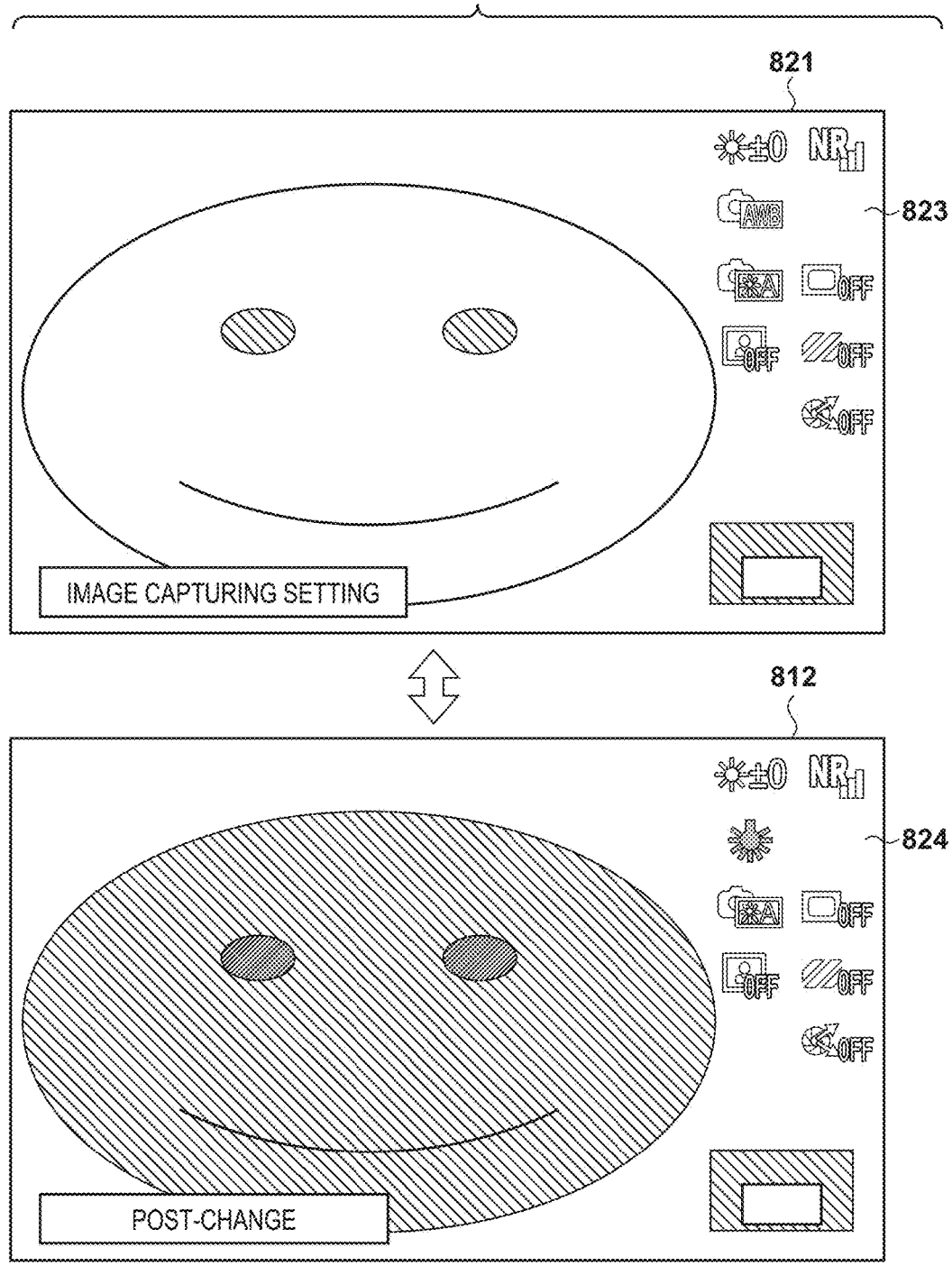

Additionally, as illustrated in FIG. 8B, the icon for the number of recorded pixels may be hidden (see reference numerals 823 and 824) for both the pre- and post-parameter change images (see preview images 821 and 822). In the case where the user wishes to see the change in color produced by the color adjustment, it is desirable to ensure that the user focuses on the change in the WB setting value, and displaying the information of the number of recorded pixels in the comparison screen may have the converse effect of causing user misunderstandings. Hiding the icon of the number of recorded pixels makes it possible to suppress this problem.

According to the present embodiment as described thus far, when generating the pre-parameter change preview image, the digital camera 100 develops the RAW image using the post-change parameter for the number of recorded pixels. This makes it easy for the user to judge whether a change in the image quality produced by changing parameters is caused by a change in the number of recorded pixels or a change in another parameter (the WB setting value, for example).

Although the WB setting value is primarily discussed as the parameter changed aside from the number of recorded pixels in the foregoing descriptions, the same effects can be obtained in the case where another parameter (for example, the brightness indicated by the display item 602 in FIG. 6A) has been changed.

Additionally, although the foregoing describes the original image as a RAW image and the image processing using the parameters as a developing process, the present embodiment is not limited thereto. The same effects can be obtained even in the case where, for example, the original image is a developed JPEG image, and image processing for changing the number of pixels and the brightness is carried out on that JPEG image.

Additionally, although the foregoing describes displaying the pre- and post-parameter change preview images in an alternating manner, the present embodiment is not limited thereto. For example, the system control unit 50 may display the pre- and post-parameter change preview images in the display unit 28 simultaneously.

Note that the various types of control described above as being performed by the system control unit 50 may be carried out by a single piece of hardware, or the control of the apparatus as a whole may be carried out by dividing the processing up among multiple pieces of hardware.

Although the foregoing has described preferred embodiments of the present invention, the present invention is not intended to be limited to the specific embodiments, and all variations that do not depart from the essential spirit of the invention are intended to be included in the scope of the present invention. Furthermore, the above-described embodiments are merely embodiments describing the present invention, and the embodiments can be combined as appropriate as well.

Furthermore, although the foregoing embodiment describes an example in which the present invention is applied in the digital camera 100, the present invention is not limited to this example, and can be applied in any image processing apparatus that executes image processing according to image processing parameters. In other words, the present invention can also be applied in personal computers, PDAs, mobile telephone terminals, portable image viewers, printer apparatuses including displays, digital photo frames, and the like. The present invention can furthermore be applied in music players, game consoles, e-book readers, tablet terminals, smartphones, projector devices, home electronic devices and in-vehicle devices that include displays, and so on.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-154022, filed Aug. 4, 2016, which is hereby incorporated by reference herein in its entirety.

What is claimed is:

1. An image processing apparatus comprising one or more processors and a memory storing a program which, when executed by the one or more processors, causes the image processing apparatus to function as units comprising:
   a changing unit configured to change a parameter relating to image processing on an original image; and
   a display control unit configured to carry out control to generate a first image by executing first image processing on the original image based on the changed parameter by the changing unit and to display the first image as an image corresponding to the changed parameter, and to carry out control to generate a second image by executing second image processing on the original image based on the parameter before the change by the changing unit and to display the second image as an image corresponding to the parameter before the change,
   wherein in a case where a predetermined parameter for changing a number of pixels is changed by the changing unit, the display control unit carries out control to generate the second image by (i) executing processing to change a number of pixels on the original image based on the predetermined parameter changed by the changing unit and (ii) executing the second image processing, and to display the second image as an image corresponding to the parameter before the change.

2. The image processing apparatus according to claim 1, wherein the changing unit changes the parameter relating to the image processing on the original image on the basis of an operation from a user.

3. The image processing apparatus according to claim 1, wherein the parameter relating to the image processing includes a plurality of types of parameters, and
   wherein the predetermined parameter is a parameter for resizing processing.

4. The image processing apparatus according to claim 1, wherein the display control unit carries out control such that information indicating the parameter before the change by the changing unit is displayed along with the second image.

5. The image processing apparatus according to claim 1, wherein the display control unit carries out control such that information indicating the changed parameter by the changing unit is displayed along with the second image.

6. The image processing apparatus according to claim 1, wherein the display control unit carries out control such that information indicating the changed parameter is displayed along with the first image.

7. The image processing apparatus according to claim 1, wherein the display control unit carries out control such that the first image and the second image are displayed in an alternating manner.

8. The image processing apparatus according to claim 1, wherein the display control unit carries out control such that the first image and the second image are displayed simultaneously.

9. The image processing apparatus according to claim 1, wherein the program, when executed by the one or more processors, causes the image processing apparatus to further function as a determining unit configured to determine a display magnification of the first image and the second image,
> wherein the image processing unit generates a third image by carrying out the image processing on the original image in accordance with the parameter before the change, and
> wherein in the case where the display magnification is less than a threshold, the display control unit carries out control such that the third image is displayed at the display magnification instead of the second image.

10. The image processing apparatus according to claim 1, wherein the original image is a RAW image.

11. The image processing apparatus according to claim 10, wherein the image processing is developing processing.

12. The image processing apparatus according to claim 10, wherein the parameter before the change by the changing unit is a parameter obtained from an image file including the RAW image.

13. The image processing apparatus according to claim 12, wherein the parameter before the change by the changing unit is a parameter applied in developing carried out when the RAW image is captured.

14. The image processing apparatus according to claim 10, further comprising:
> an image capturing unit,
> wherein the RAW image is an image captured by the image capturing unit.

15. The image processing apparatus according to claim 1, wherein the program further causes the image processing apparatus to function as a recording control unit configured to, in response to a user instruction to save an image to which a change is applied, carry out control such that an image generated by executing image processing on the original image in accordance with the changed parameter is recorded into a recording medium as an image file.

16. The image processing apparatus according to claim 15, wherein, in response to a user instruction to save an image based on a predetermined parameter, the recording control unit carries out control such that an image generated by executing image processing on the original image in accordance with the parameter before the change is recorded in the recording medium as an image file.

17. An image processing method comprising:
> changing a parameter relating to image processing on an original image; and
> carrying out control to generate a first image by executing first image processing on the original image based on the changed parameter and to display the first image as an image corresponding to the changed parameter, and carrying out control to generate a second image by executing second image processing on the original image based on the parameter before the change and to display the second image as an image corresponding to the parameter before the change,
> wherein in a case where a predetermined parameter for changing a number of pixels is changed, the second image is generated by (i) executing processing to change a number of pixels on the original image based on the changed predetermined parameter and (ii) executing the second image processing, and the second image is displayed as an image corresponding to the parameter before the change.

18. A non-transitory computer-readable storage medium which stores a program for causing a computer to execute an image processing method comprising:
> changing a parameter relating to image processing on an original image; and
> carrying out control to generate a first image by executing first image processing on the original image based on the changed parameter and to display the first image as an image corresponding to the changed parameter, and carrying out control to generate a second image by executing second image processing on the original image based on the parameter before the change and to display the second image as an image corresponding to the parameter before the change,
> wherein in a case where a predetermined parameter for changing a number of pixels is changed, the second image is generated by (i) executing processing to change a number of pixels on the original image based on the changed predetermined parameter and (ii) executing the second image processing, and the second image is displayed as an image corresponding to the parameter before the change.

* * * * *